United States Patent [19]

Okuda et al.

[11] Patent Number: 4,708,461
[45] Date of Patent: Nov. 24, 1987

[54] COPYING MACHINE WITH A RESERVATION FUNCTION

[75] Inventors: Masakiyo Okuda, Kashiwara; Kazuyuki Ohnishi, Nara, both of Japan

[73] Assignee: Sharp Kabushiki Kaisha, Osaka, Japan

[21] Appl. No.: 813,537

[22] Filed: Dec. 26, 1985

[30] Foreign Application Priority Data

Dec. 27, 1984 [JP] Japan .................................. 59-276564
Dec. 27, 1984 [JP] Japan .................................. 59-276575

[51] Int. Cl.$^4$ ...................... G03G 21/00; G03G 15/22
[52] U.S. Cl. .................................. 355/14 R; 355/3 R
[58] Field of Search .................. 355/3 R, 14 R, 14 C, 355/14 CU

[56] References Cited

U.S. PATENT DOCUMENTS

| 3,687,540 | 8/1972 | Hashimoto | 355/14 R |
| 4,099,860 | 7/1978 | Connin | 355/14 C |
| 4,162,848 | 7/1979 | Platt, III | 355/14 C |
| 4,192,607 | 3/1980 | Hage | 355/14 SH X |
| 4,448,515 | 5/1984 | Ishikawa | 355/14 R |

FOREIGN PATENT DOCUMENTS 168059 10/1983 Japan .................................. 355/14 C Primary Examiner—Fred L. Braun
Attorney, Agent, or Firm—Birch, Stewart, Kolasch & Birch

[57] ABSTRACT

A copying machine which can stop or interrupt a copying operation of reserved originals even when it is still in the middle of a copying operation so as to permit the copying of un-reserved originals. The interruption takes place when a human body sensor detects a person coming up to the copying machine, or when a timer counts up a predetermined time. Also, the copying machine has a first counter which counts a first predetermined time after the end of the copying operation. If no copying operation is performed during the first predetermined time, a second counter starts to count a second predetermined time immediately after the first predetermined time. During the counting of the second predetermined time, a copy start button is made invalid. When the second predetermined time is counted, the reserved copying operation starts.

6 Claims, 11 Drawing Figures

Fig. 1
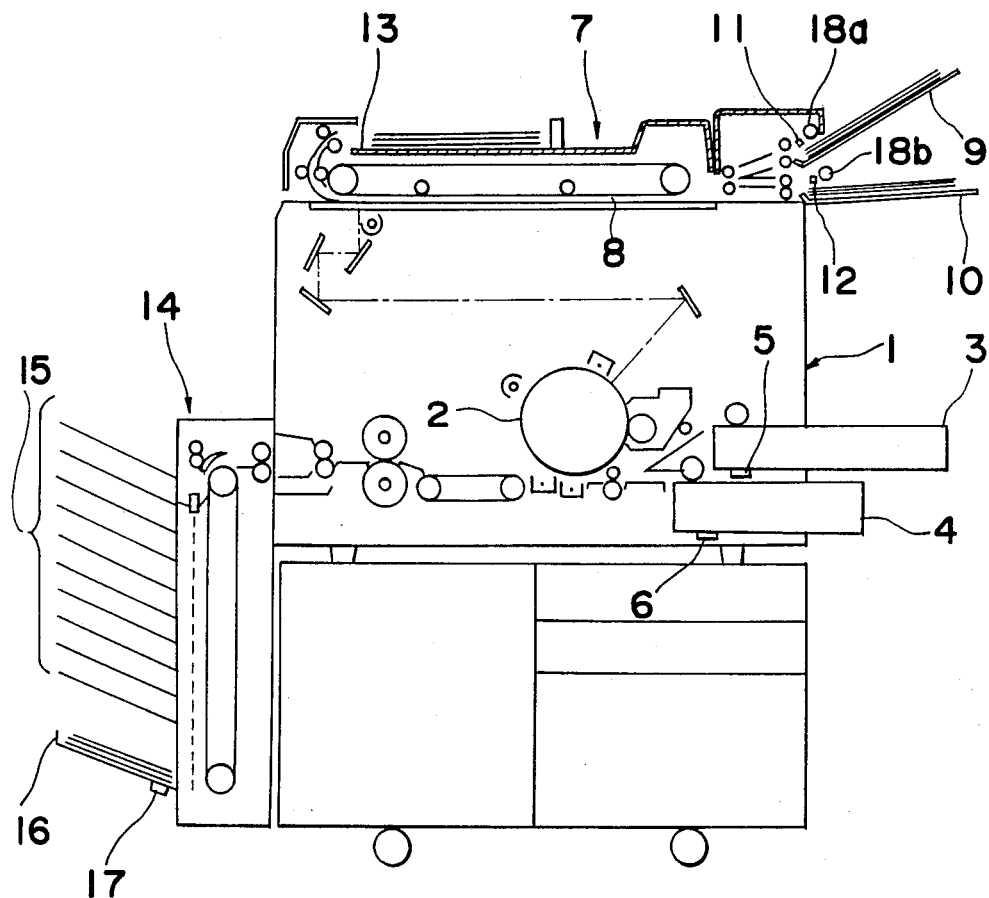
Fig. 3
Fig. 4
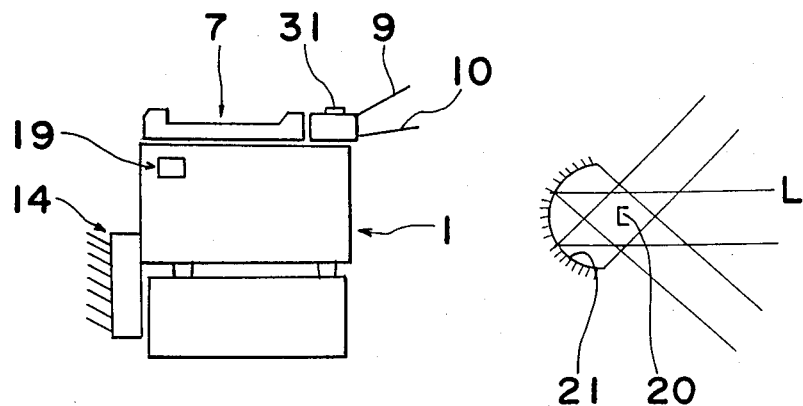

COPYING MACHINE WITH A RESERVATION FUNCTION

BACKGROUND OF THE INVENTION

The present invention generally relates to a copying apparatus and more particularly, to a copying machine provided with a reserve function, for automatically copying reserved originals set on an original tray.

A conventional copying machine with a reserve function allows no interruptions of the copying process by the copying of other originals once the copying of reserved originals has started, unless copying of the reserved originals is completed. For this reason, once copying of the reserved originals has started, a user walking up to a copying machine with new originals, other than the reserved ones, has to wait until the copying of reserved orginals is completed. This causes time loss, an inconvenience when the number of copies is too large, and machine inefficiency, when urgent copies, other than those that are reserved, can not be made.

Also, the conventional copying machine with a reserve function has a feature such that when a user is successively making copies of un-reserved and reserved originals, reserved original copying operation starts when a predetermined time elapses after un-reserved original copying is completed.

Under the above condition, if the copying operation for the un-reserved originals is carried out one-by-one, through the steps of opening a cover, setting the original on a platform, closing the cover and depressing the copy button, there may be a case when the user takes a long time between the steps which is longer than the allotted predetermined time. If this happens, the reserved original copying operation starts, resulting in a drawback whereby the user may be confused because it will be difficult to distinguish between the un-reserved copy and the reserved copy since reserved copying starts in the middle of the process.

SUMMARY OF THE INVENTION

Accordingly, it is an essential object of the present invention to provide a copying machine with a reserve function which performs copying of reserved originals when normal copying of un-reserved originals is not performed, and can interrupt the reserved copying operation when urgent copying of un-reserved originals is required.

Another important object of the present invention is to provide a copying machine with a reserve function which distinguishes between reserved and un-reserved copying by inhibiting the operation of un-reserved copying before the start of reserved copying.

In accomplishing these and other objects according to one preferred embodiment of the present invention, there is provided a copying machine having a determining means for judging whether or not the copying machine is in a condition for copying originals other than reserved ones during the reserved copying operation, and means for copying originals prior to the copying of reserved ones when the judging means determines that a situation is available for copying originals other than reserved ones.

According to the present invention, for example, when a user approaches the copying machine to make normal (un-reserved) copies, during the execution of reserved copying, the machine interrupts reserved copying to permit normal copying. Thus, it is possible to give priority to urgent copying over reserved copying and to avoid time loss while waiting for the end of a large-quantity of reserved copying and to increase copying machine efficiency. In addition, if a time period for reserved copying is set at a time such as a lunch break, when normal copying is not so frequently performed, non-urgent reserved copying or reserved copying in large quantities ca be performed without disturbing the use of the machine for normal copying. This secures proper, efficient use of the copying machine with a reserve function.

Further, the copying machine includes a judging means for determining, when reserved original copying is reserved, whether or not a predetermined time period has elapsed from the end of normal copying before the reserved copying operation, and an inhibiting means for inhibiting normal copying before the start of reserved copying, after the judging means has determined that the predetermined time period has elapsed.

According to the construction of the present invention, when normal copying occurs within a specified time after the previous normal copying has ended and before the start of reserved copying, normal copying is allowed to continue execution, but after the specified time has elapsed, normal copying operation is inhibited. Consequently, when normal copying is performed within the specified time, normal copying cannot be interrupted by reserved copying. On the other hand, if normal copying is not carried out after the specified time has elapsed, the machine starts reserved copying based on the determination that normal copying is not being carried out. This provides a clear distinction between normal copying and reserved copying, leading to improved manipulation characteristics of the copying machine and eliminates user confusion.

The copying machine according to the present invention has an improved arrangement which can stop or interrupt a copying operation of reserved originals even when it is still in the middle of the reserved copying operation so as to permit the copying operation of un-reserved (normal) originals. The interruption takes place when a human body sensor detects a person coming up to the copying machine, or when a timer counts up a predetermined time. Also, the copying machine has a first counter which counts a first predetermined time after the end of the normal copying operation. If no copying operation is performed during the first predetermined time, a second counter starts to count a second predetermined time immediately after the first predetermined time. During the counting of the second predetemined time, a copy start button is made invalid. When the second predetermined time is counted, the reserved copying operation starts.

BRIEF DESCRIPTION OF THE INVENTION

These and other objects and features of the present invention will become apparent from the following description taken in conjunction with the preferred embodiment thereof with reference to the accompanying drawings, in which:

FIG. 1 is a schematic view showing the whole construction of a copying machine according to one preferred embodiment of the present invention;

Figure 7:
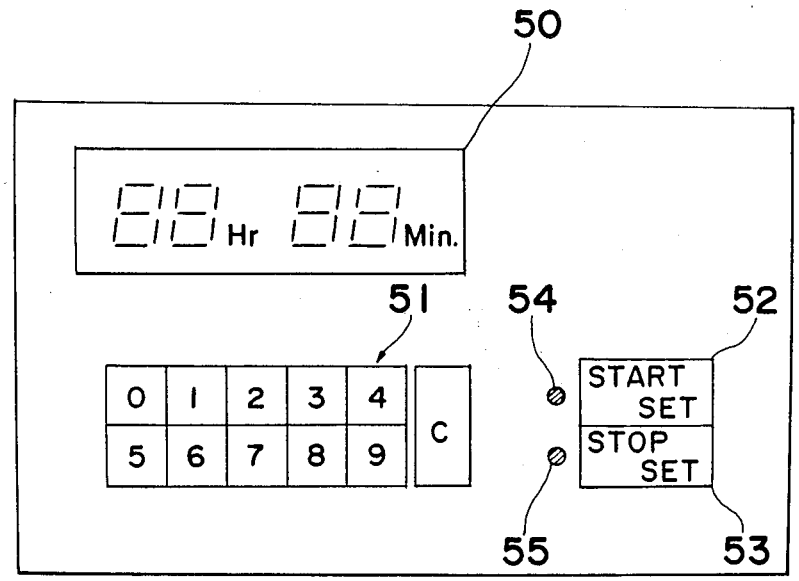
Figure 5A:
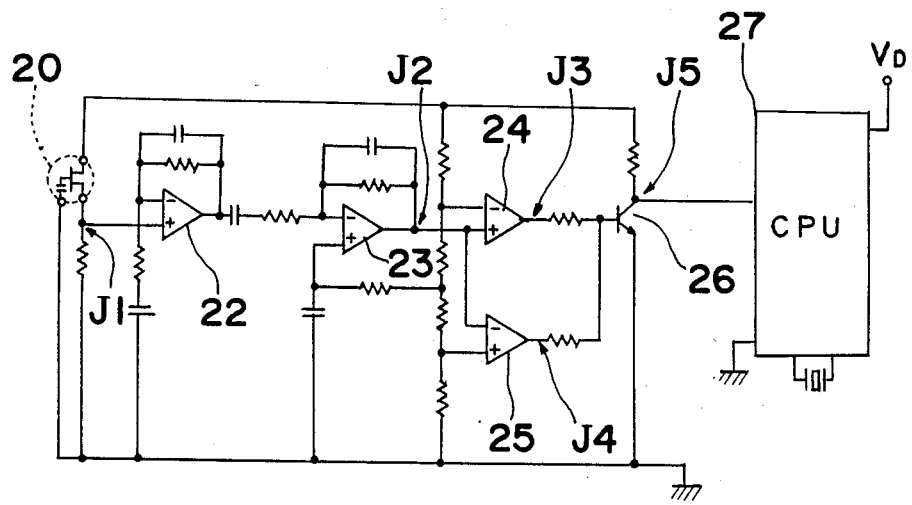
Figure 5B:
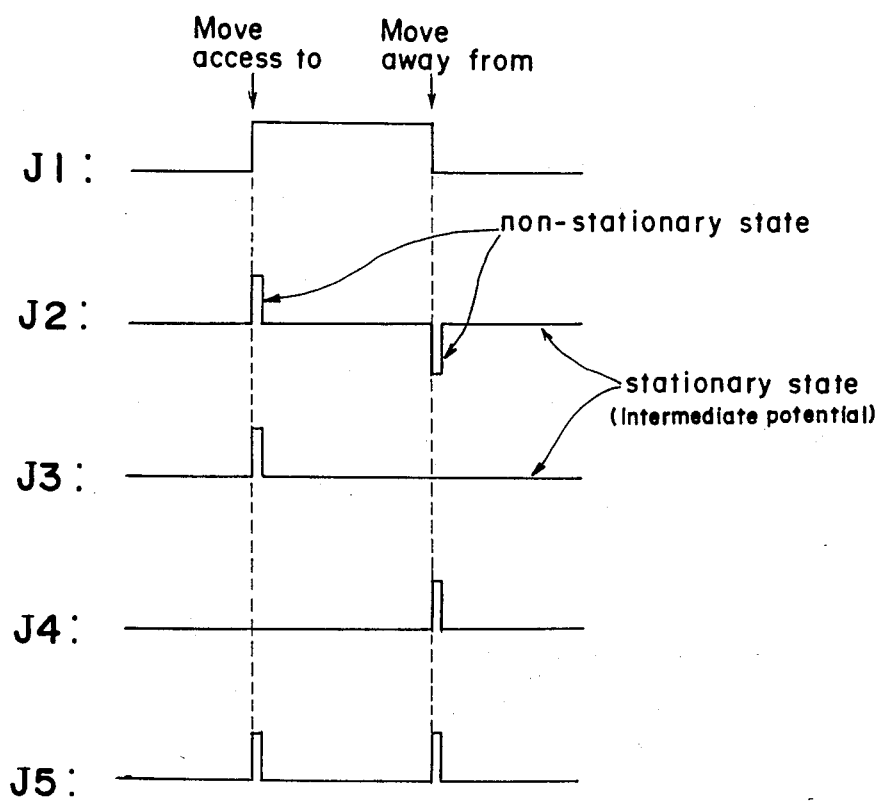
Figure 6:
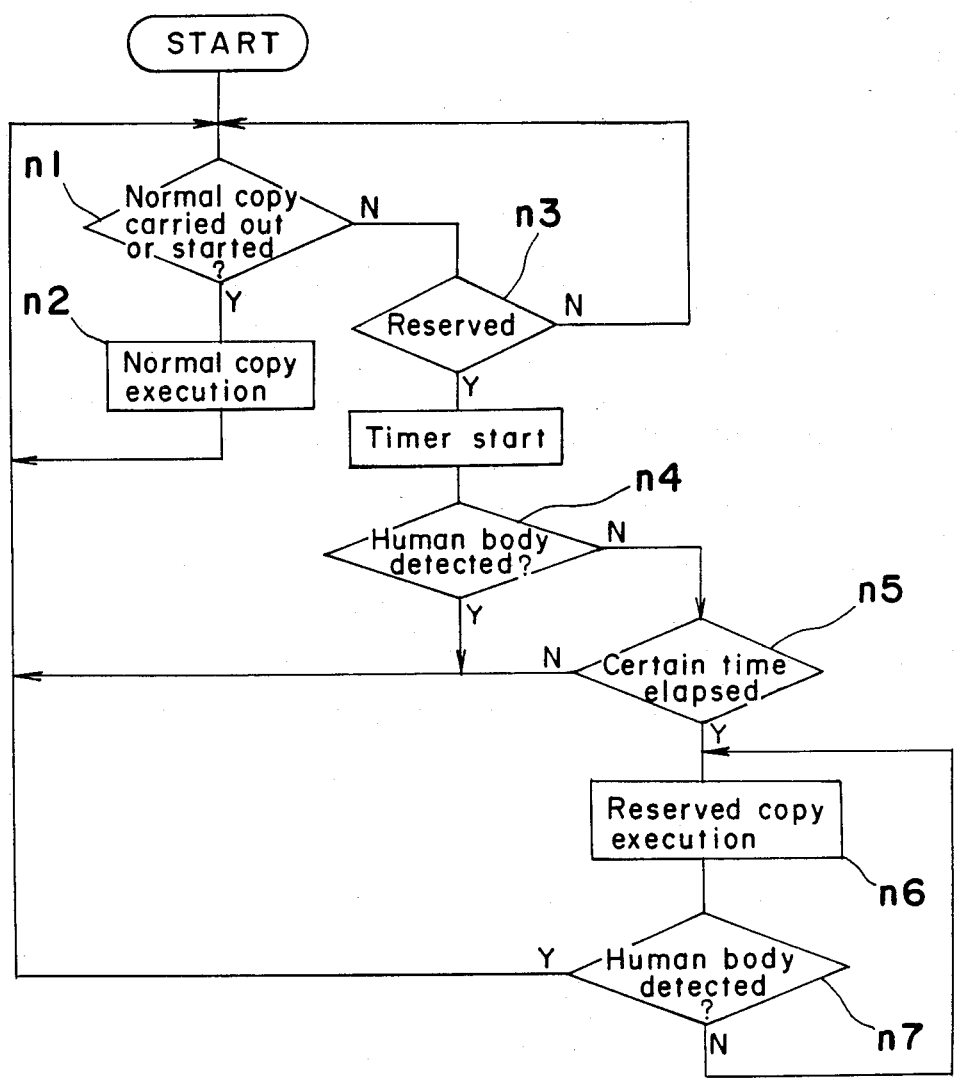
Figure 8:
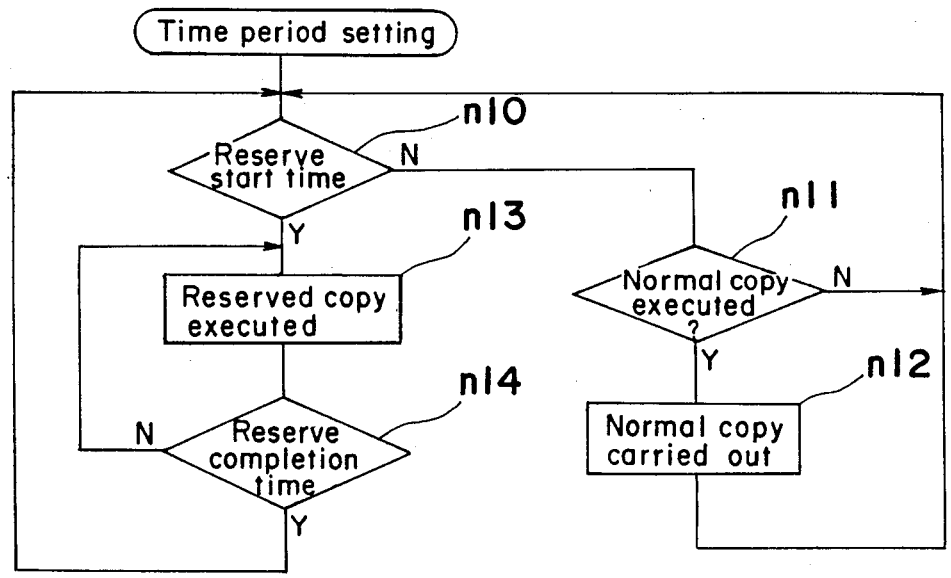
Figure 9:
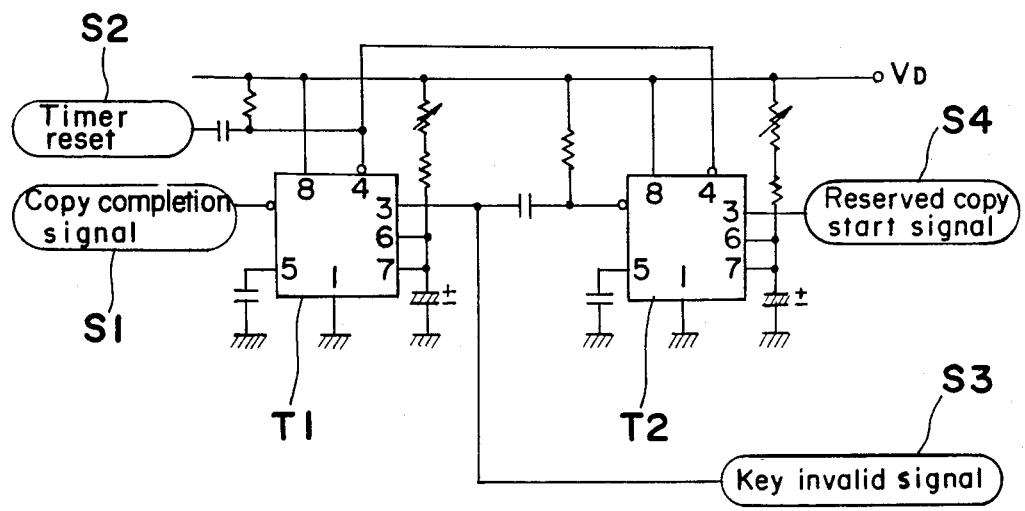
Figure 10:
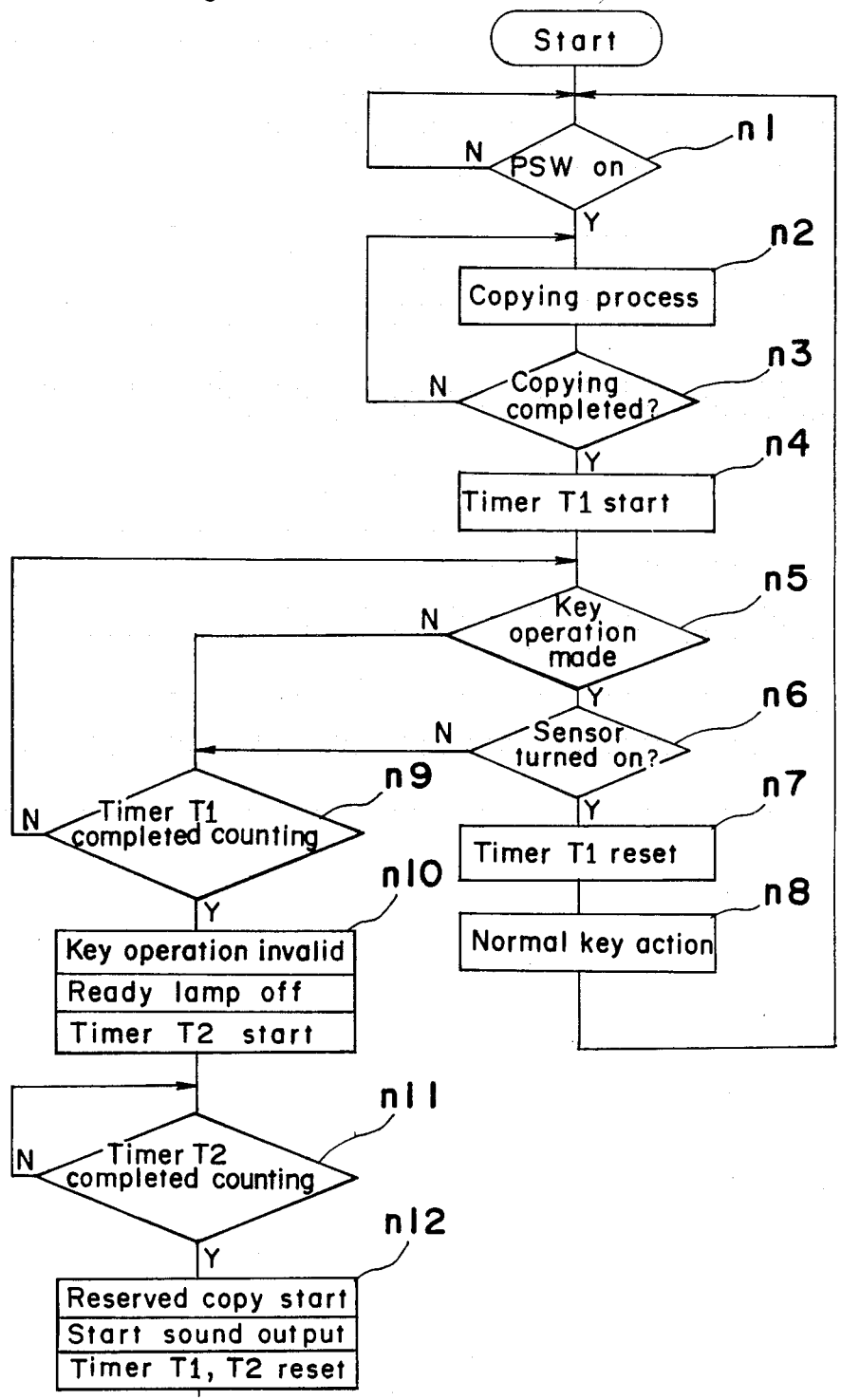

FIG. 3. is a schematic front elevational view of the copying machine of FIG. 1;

FIG. 4 is a view showing the construction of a human body sensor which is applied to the present invention;

FIG. 5a is a circuit diagram of a human body sensing section of the human body sensor;

FIG. 5b is wave patterns shown at representative positions in the circuit diagram of FIG. 5a;

FIG. 6 is a flow chart showing the action of the copying machine with a reservation function according to one preferred embodiment of the present invention;

FIG. 7 is a view showing the time period setting section used in another embodiment of the present invention;

FIG. 8 is a flow chart showing the action of another embodiment of the present invention;

FIG. 9 is a main circuit diagram of a control section of the copying machine of FIG. 1 for monitoring the copying machine timers; and FIG. 10 is a flow chart showing the action of the copying machine when performing reserved copying.

DETAILED DESCRIPTION OF THE INVENTION

Before the description of the present invention proceeds, it is to be noted that like parts are designated by like reference numerals throughout the accompanying drawings.

FIG. 1 is a view showing the whole construction of a copying machine with a reservation function according to one preferred embodiment of the present invention.

In FIG. 1, a reference numeral 1 designates a body of a copying machine having built-in copying mechanism containing a photosensitive drum 2. Body 1 is provided with paper feed cassettes 3 and 4. Numerals 5 and 6 represent empty cassette sensors for detecting papers loaded in the respective cassettes.

Numeral 7 represents an ADF (automatic document feeder) mounted on top of the copying machine body 1 having two reserved-original trays 9 and 10. Numeral 8 is an original conveyor belt which transfers reserved originals from the reserved-original trays 9 and/or 10 to an exposure position of the copying machine body 1. After the end of an exposure process, the exposed originals are discharged to an original discharge tray 13 on top of ADF 7. When both reserved original trays 9 and 10 are mounted with reserved originals, copying is performed in the order from the upper to the lower stage. Numerals 11 and 12 indicate original sensors arranged on reserved-original trays 9 and 10, respectively. Original sensors 11 and 12 comprise light emitting and receiving elements which detect an original being sent by the light received and reflected by a reflector sheet (not shown) provided on the reserved-original tray. When reserved originals are set on the tray 9 or 10, the quantity of light received by the sensor 11 or 12 is very low, and thereby, the sensor 11 or 12 detects the presence of the originals. Numerals 18a and 18b are paper-feed rollers which feed reserved originals on the original trays 9 and 10, respectively.

The copying machine body 1 is provided with a sorter 14. Sorter 14 has a plurality of bin stages 15 with the bottom bin stage 16 dedicated to receive reserved copies. Copied papers produced during reserved copying are discharged into bin 16. Numeral 17 is an empty-bin sensor for detecting copied papers in bin 16.

Figure 2:
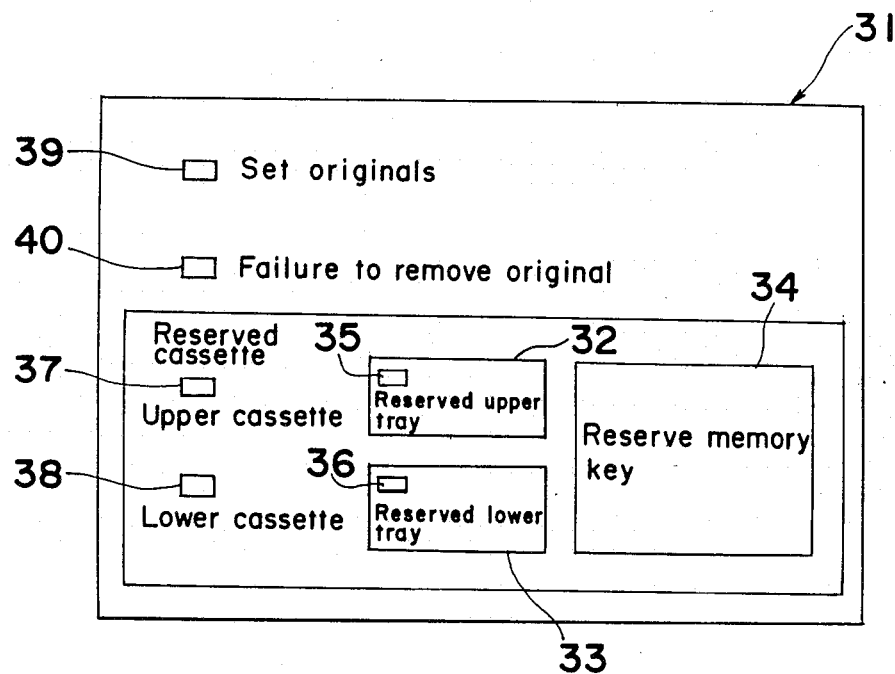
FIG. 2 is a top plan view showing an operation section of an automatic document feeder for the copying machine of FIG. 1.

ADF operation section 31, shown in FIG. 2, is provided with an upper tray reserve key 32 and a lower tray reserve key 33, and a reserve memory key 34. Upper-tray reserve key 32 and lower-tray reserve key 33 are provided with reserved original-tray indicators 35 and 36, respectively. Numerals 37 and 38 are indicators for indicating that the upper or lower paper-feed cassette is reserved. Numeral 39 is an indicator for indicating the lack of originals on the tray, and 40 is an indicator for indicating that the originals have yet to be removed from the tray after copying has been completed.

The reserving procedure is such that a reserve key of a vacant reserved-original tray is pressed. Original display 39 flashes on and off and induces original setting. At this point, reserved-original tray indicators 35 and 36 on the selected reserved-original tray also flash. Upon setting of reserved originals on the reserved-original tray, original display 39 turns off. The number of originals, size of copy paper, and copying conditions, such as depth of color, are inputted and reserve memory key 34 is pushed down. By the depression of key 34, the reserve setting is complete, and thereupon, the reserve-indication lamp of the selected reserved-original tray stops flashing and turns on continuously. If empty bin sensor 17 detects that dedicated reserve bin 16 is occupied, a reserve setting can not be completed even with reserve memory key 34 pushed down.

As shown in FIG. 3, a human body sensor 19 is provided at the front of copying machine body 1.

As shown in FIG. 4, the human body sensor 19 is a pyroelectric detector 20 comprising a pyroelectric-type infrared sensor. For example, infrared rays having wavelength peaks of 10 micrometers are radiated from a human body at 30° C. Pyroelectric detector 20 is highly sensitive to this wavelength peak. Symbol 21 represents a condenser mirror for converging infrared rays L radiated from a human body in a wide visual angle.

FIG. 5a shows a human-body detecting circuit using the human-body-detecting sensor 19. The output of pyroelectric detector 20 is amplified by a first stage amplifier 22 and introduced into an amplifier 23 with the direct-current component cut off. The output from the amplifier 23 is inputted into third and fourth comparators 24 and 25. The output from the amplifier leaves the intermediate potential in the non-stationary state only when the sensor shifts from the condition of detecting a human body to no detection, or in the reverse situation, and then returns to the stationary state. If the output of amplifier 23 leaves the intermediate potential, third and fourth comparators 24 and 25 are turned on and they then turn on the output transistor 26. Activated transistor 26 informs a CPU (Central Processing Unit) 27 in the control section that a human body, or a user, has approached or left the machine.

FIG. 5b illustrates wave patterns at junctions or positions of J1 through J5 in the human-body-detecting circuit as shown in FIG. 5a.

FIG. 6 illustrates the operation when reserved copying is performed assuming that reserved originals are set on the reserved-original tray and copying is prepared. Step n1 determines whether normal copying or preparation should be continued (step n2). If normal copying is not being performed, step n3 determines whether reserve copying has been set. When it is judged that a reservation has been made, it starts a timer (not shown) built in CPU 27 and monitors the approach of a user until the end of the timed interval (steps n4 and n5). When human body sensor 19 detects the approach of a human body, it returns to the condition for receiving normal copying (step n1). If no human body approach has been detected until the end of the timed interval, reserved copying is started (step n6). If the human body sensor 19 detects an approaching human body, even after the start of reserved copying, the reserved copying is interrupted and it returns to a normal copy receiving condition (step n1). Step n7 is the condition in which the output power has returned. This construction permits normal copying even if reserved copying is being executed because normal copying has priority over reserved copying.

The above embodiment shows the case in which normal copying is carried out while reserved copying is executed by way of sensing the approach of a user who intends to make normal copies. According to another embodiment of the present invention, a time period setting section is provided in the ADF operation section 31, as shown in FIG. 7, to preset execution time periods for performing reserved copying.

In FIG. 7, numeral 50 is an indicator for displaying set time periods, 51 are input keys for keying in the time, 52 and 53 are start-set and stop-set keys, respectively, and 54 and 55 are indicators for displaying set conditions by start-set key 52 and stop-set key 53. To set the execution time period for reserved copying, the reserve start time is first keyed in by input keys 51, and start-set is made by pressing start-set key 52. Then, the reserve end time is keyed in by input keys 51, and stop set is made by pressing stop-set key 53.

FIG. 8 is a flow diagram showing the operation of reserved copying when the execution time period is set by the above time-period-setting section.

First, step n10 determines whether a reserve start time exists. If not, only normal copying can be performed (steps n11 and n12). After the reserve start time (step n10) has been reached, reserved copying starts until the reserve end time (steps n13 and n14) is reached. Such action causes reserved copying to be executed only during a preset time period. Thus, if a time period for executing non-urgent copying or copying in large quantities is set in a low-use time period, reserved copying can be performed without disturbing normal copying.

Referring to FIGS. 9 and 10, the second embodiment of the present invention will be described hereinafter.

FIG. 9 illustrates an essential construction of a controller for monitoring the timers for reserved copying. T1 and T2 are first and second timers comprising ICs. Timer T1 is triggered by a copy-end signal S1 and counts a predetermined time t1. During the counting of time t1 by timer T1, if original detecting sensors 11 and 12 detect originals, and cassette empty sensors 5 and 6 detect papers loaded in the respective cassettes, a timer reset signal S2 is inputted to stop timer T1. However, if timer T1 completes counting time t1, a trigger signal is sent from timer T1 and timer T2. This trigger signal can also be used as an invalid signal key S3 to inhibit key operation and to turn the copy-start button (not shown) off indicating that the copying operation can not be started by the copy start button. At the end of a predetermined time t2, timer T2 produces a reserve copy start signal S4 to start reserved copying. Copy end signal S1 and timer reset signal S2 are produced from the control section (not shown) provided in the copying machine body 1, and an invalid signal key S3 and the reserve copy start signal S4 are inputted to the control section.

FIG. 10 shows the operation of sequentially performed reserved copying and normal copying. The reserved originals are set on the reserved-original tray in preparation for reserved copying. Before the start of reserved copying, normal copying of originals other than reserved ones is started by the copy start button PSW pressed at step n1. When a large volume of copying is to be performed, copying is repeated until it ends (steps n2 and n3). When the copying operation is complete, timer T1 starts (step n4). If no copying is performed during the counting of timer T1 (steps n5, n6 and n9), the key operation becomes invalid at the end of counting. In other words, when the copying other than the reserved copying is completed and after counting the time t1, the ready lamp is turned off (step n10). This inhibits the start of copying other than the reserved copying. When time t1 is counted, the second timer T2 starts (step n10). When timer T2 counts time t2, the reserved copying operation starts (steps n11 and n12). When reserved copying starts, a start sound producing means (not shown), provided at the ADF operation section 31, produces a starting sound for indicating the start of the reserved copying operation and, at the same time, timers T1 and T2 are reset (n12).

If an operation for normal copying is made before timer T1 counts time t1, the copying operation just requested will be started prior to the start of reserved copying (steps n5, n6 and n9). Keying in the copying conditions or the sensor turning-on are regarded as an operation for normal copying (steps n5 and n6). In this case, timer T1 must be reset before starting the normal copying based on the keyed-in copying conditions (steps n7 and n8).

According to the second embodiment of the present invention, since reserved copying does not start, if normal copying operation is requested before timer T1 counts time t1, normal copies can be continued without any interruption by the reserved copying operation. Here, at step n6, the request of the normal copying operation can be detected either by the detection of a reserved original setting, the detection of a reserved cassette setting, opening and closing of the original cover, or error detections in either the copying machine body 1 or ADF 2.

In the above described embodiment, timer T2 is started at the end of counting t1 of timer T1, but timer T2 can be started simultaneously with the start of timer T1. In this case, time t2 is greater than time t1.

Although the present invention has been fully described by way of examples with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A copying machine with a reserve function for automatically copying reserved originals set on original trays, comprising:

a judging means for judging whether or not the copying machine is in a condition for copying originals other than reserved originals during the reserved copying operation and;

means for copying originals prior to the copying of reserved originals when said judging means judges that originals other than reserved originals should be copied, wherein said judging means judges that said copying machine is in a condition in which it can be used for copying originals other than reserved originals when a predetermined time period has elapsed subsequent to copying a reserved original.

2. A copy machine according to claim 1, wherein said judging means further judging, when reserved original copying is being performed, whether or not a predetermined time period has elapsed from the end of copying originals before enabling a reserved copying operation, and further including an inhibiting means for inhibiting original copying before the start of reserved copying, after the judging means has judged that said predetermined time period has elapsed.

3. A copying machine with a reserve function for automatically copying reserved originals set on original trays, comprising:

judging means for judging whether or not the copying machine is in a condition for copying originals other than reserved originals during the reserved copying operation, wherein said judging means includes a human body sensor arranged on said copying machine, said judging means judging, in response to the sensing of a human body by said sensing means, when said copying machine is in a condition in which it can be used for copying originals other than reserved originals; and means for copying originals prior to the copying of reserved originals when said judging means judges that a situation is available for copying originals other than reserved originals.

4. A copying machine for automatically copying reserved originals or for copying non-reserved originals different from said reserved originals, said copying machine comprising:

means for determining whether said copying machine is in a reserved mode for copying reserved originals or a non-reserved mode for copying non-reserved originals, said means for determining including means for sensing a human body in proximity to said copying machine;

means, responsive to said means for sensing, for interrupting said copying machine when in the reserved mode, and thereby enabling said copying machine to copy non-reserved originals in the non-reserved mode; and means for placing said copying machine in said non-reserved mode to thereby copy non-reserved originals prior to resuming copying of reserved originals in response to the determination by said means for determining that the copying machine is in the non-reserved mode.

5. A copying machine according to claim 4, further including first counter means for counting a first predetermined length of elapsed time after completion of a most recent non-reserved copying operation, second counter means for counting a second predetermined length of elapsed time subsequent to said first predetermined length of elapsed time, and means for inhibiting the non-reserved copying operation during said second predetermined length of elapsed time, whereby said copying machine switches to said reserved mode.

6. A copying machine with a reserve function for automatically copying reserved originals set on original trays, comprising:

means for interrupting said copying machine for copying originals other than reserved originals during a reserved copying operation, wherein said means for interrupting includes a human body sensor arranged on said copying machine for sensing a human body, said means for interrupting enabling said copying machine to copy originals other than reserved originals in response to said sensing; and means for copying originals prior to resuming the copying of reserved originals in response to said means for interrupting said copying machine.

* * * * *